(12) United States Patent (10) Patent No.: US 6,999,265 B1
Schreck et al. (45) Date of Patent: Feb. 14, 2006

(54) METHOD AND SYSTEM FOR DUAL ELEMENT TRANSDUCER FLIGHT HEIGHT ADJUSTMENT USING COMBINED THERMAL AND ELECTROSTATIC CONTROL

(75) Inventors: Erhard Schreck, San Jose, CA (US);
Thao Nguyen, San Jose, CA (US);
Brian Strom, Cupertino, CA (US);
Lydia Baril, Sunnyvale, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/981,376

(22) Filed: Nov. 3, 2004

Related U.S. Application Data

(60) Provisional application No. 60/517,845, filed on Nov. 6, 2003.

(51) Int. Cl.
*G11B 21/02* (2006.01)
(52) U.S. Cl. ..................................... 360/75; 360/77.02
(58) Field of Classification Search ................. 360/75, 360/25, 31, 245.7, 236.5, 294.7, 234.7, 294.5
See application file for complete search history.

(56) References Cited

U.S. PATENT DOCUMENTS

| | | | | |
|---|---|---|---|---|
| 5,991,113 A | * | 11/1999 | Meyer et al. ................. | 360/75 |
| 6,005,736 A | | 12/1999 | Schreck ....................... | 360/75 |
| 6,057,975 A | * | 5/2000 | Yaeger et al. ................. | 360/75 |
| 6,172,832 B1 | | 1/2001 | Dovek et al. ................. | 360/66 |
| 6,266,205 B1 | | 7/2001 | Schreck et al. .......... | 360/77.06 |
| 6,307,719 B1 | * | 10/2001 | Mallary .................... | 360/294.7 |
| 6,344,949 B1 | * | 2/2002 | Albrecht et al. ......... | 360/236.5 |
| 6,501,606 B1 | * | 12/2002 | Boutaghou et al. ........... | 360/25 |
| 6,567,229 B1 | | 5/2003 | Mallary et al. ............... | 360/75 |
| 6,597,539 B1 | * | 7/2003 | Stupp et al. ............. | 360/245.7 |
| 6,760,181 B1 | * | 7/2004 | Li et al. ....................... | 360/75 |
| 6,801,376 B1 | * | 10/2004 | Smith .......................... | 360/31 |
| 6,842,308 B1 | * | 1/2005 | Pust et al. ............... | 360/234.7 |
| 6,859,346 B1 | * | 2/2005 | Meyer .................... | 360/294.5 |
| 6,876,509 B1 | * | 4/2005 | Bonin et al. .................. | 360/75 |
| 6,934,113 B1 | * | 8/2005 | Chen ........................... | 360/75 |

* cited by examiner

*Primary Examiner*—David Hudspeth
*Assistant Examiner*—Fred Tzeng
(74) *Attorney, Agent, or Firm*—Margaret M. Kelton; David Sigmond

(57) ABSTRACT

A method and system control the flight height of a transducer element of a slider mechanism operating in association with a storage disk. The invention adjusts the flight height of transducer element to a first flight height using an electro-mechanical control mechanism. The flight height of transducer element then achieves a second flight height using a thermal control mechanism. The thermal control mechanism is associated with a thermally responsive portion of transducer element. By heating the thermally responsive portion, a portion of transducer element becomes sufficiently proximate to the storage disk for the transducer element to respond to physical forces arising from electrostatic induction between transducer element and the storage disk. Flight height adjustment of transducer element from the second flight height to a third flight height may then occur using an electrostatic control mechanism which generates a physical force through electrostatic induction.

76 Claims, 4 Drawing Sheets

METHOD AND SYSTEM FOR DUAL ELEMENT TRANSDUCER FLIGHT HEIGHT ADJUSTMENT USING COMBINED THERMAL AND ELECTROSTATIC CONTROL

CROSS-REFERENCE TO RELATED APPLICATIONS

This application claims priority to U.S. Ser. No. 60/517,845 filed Nov. 6, 2003, entitled "Combined Electrostatic and Thermal Flying Height Adjustment for Coarse and Fine Control," and is incorporated herein by reference in its entirety.

FIELD OF THE INVENTION

The present invention relates to digital storage devices and, more particularly, to a method and system for dual element transducer flight height adjustment using combined thermal and electrostatic control.

BACKGROUND OF THE INVENTION

A magnetic storage disk drive system is a digital data storage device that stores digital information within concentric tracks on a storage disk (or platter). The storage disk is coated with a magnetic material that is capable of changing its magnetic orientation in response to an applied magnetic field. During operation of a storage disk drive, the storage disk is rotated about a central axis at a substantially constant rate. To write data to or read data from the storage disk, a magnetic transducer is positioned above a desired track of the storage disk while the storage disk is spinning. Different techniques may be used to move the transducer from a current track to the desired track so that the transducer is properly positioned over the desired track for reading and writing.

Writing is performed by delivering a write signal having a variable current to a transducer while the transducer is held close to the rotating storage disk over the desired track. The write signal creates a variable magnetic field at a gap portion of the transducer that induces magnetic polarity transitions into the desired track. The magnetic polarity transitions are representative of the data being stored.

Reading is performed by sensing magnetic polarity transitions previously written on tracks of the rotating storage disk with the transducer. As the storage disk spins below the transducer, the magnetic polarity transitions on the track present a varying magnetic field to the transducer. The transducer converts the magnetic signal into an analog read signal that is then delivered to a read channel for appropriate processing. The read channel converts the analog read signal into a properly timed digital signal that can be recognized by a host computer system external to disk drive.

The transducer is often dual-purpose, meaning the same transducer can both read from and write to the magnetic storage disk. Combining read and write functions into the same transducer allows some of the structure used for writing also to be used for reading. A dual purpose transducer cannot perform both read and write functions at the same time because, among other reasons: (1) their shared structures generally prohibit use of both functions at one time; and, (2) the magnetic field generated during a write operation tends to saturate the sensitivity of the read element.

Sliders are generally mounted on a gimbaled flexure portion. The gimbaled flexure portion is attached to one end of a suspension's load beam assembly. An opposite end of the suspension's load beam assembly is attached to the in-line rotary voice coil actuator, which provides pivotal motion to slider. A spring biases the load beam and slider with the read/write transducer towards the storage disk, while the air pressure beneath slider developed by storage disk rotation relative to slider pushes slider away from the storage disk. The gimbaled flexure enables slider to present a "flying" attitude toward the storage disk surface and follow its topology. An equilibrium distance defines an "air bearing" and determines the "flying height" of the read/write transducer. Although the separation between the read/write transducer and storage disk created by the air bearing reduces read/write transducer efficiency, the avoidance of direct contact of the transducer with the storage disk vastly improves reliability and extends the useful life of the read/write transducer and storage disk. The air bearing slider and read/write transducer combination is also known as a read/write head/slider assembly or head.

Currently, nominal flying heights are on the order of 0.5 to 2 microinches. For a given read/write transducer, the magnetic storage density increases as the read/write transducer approaches the storage surface of the storage disk. Thus, a very low flying height is traded against transducer reliability over a reasonable service life of the storage disk drive. Increases in data storage densities will require decreases in read/write transducer flying height to near or intermittent contact with a storage surface of the storage disk.

Additionally, the storage disk drive industry has been progressively decreasing both the size and mass of slider structures to reduce the moving mass of the actuator assembly and to permit near or intermittent contact operation of the read/write transducer with the storage disk surface. The former gives rise to improved seek performance and the latter gives rise to improved transducer efficiency and higher aerial density, but at a cost of reduced transducer reliability.

Presently, flight height adjustments occur at using a thermal control mechanism. Unfortunately, the thermal control mechanism exhibits a slow actuation time during thermal flight height adjustment. This is especially important during the write/read and read/write transitions. Current ways to implement a solution to handle the write-read transition issue involve either complex implementation in the firmware or in the sequencer.

One method known as overshoot and undershoot control has a limited use because it is not available during all operating modes. The disadvantage of the old method is that it has to take the current state of the thermal flight height adjustment and write history into account. This requires keeping track of these parameters during the write operation. However, since read and write operations are not allows accessible to the firmware it also requires changes in the hardware components. [I don't understand this last sentence, nor what is intended.]

In a thermally controlled system, the height is principally controlled by a coil heater. When the reading occurs, these systems pull the write head back by a certain amount to allow the thermal protruding to position the write head to a level similar to that occurring during the read operation. Due to the slowness of the thermal response of the device and different time constants between the heater and over the writer coil, the transducer element flight height cannot be set any lower. This limitation, therefore, poses a constraint to further recording densities.

In a multi-headed system, there is the need to switch from one write transducer element to another. To preserve performance, there is the need set the flight height of the transducer element to which control is switching prior to the switching occurring. In other words, there is a need to preheat the target transducer. Otherwise, further degradations in read/write performance occur. When switching from one write transducer element to another, preheating may not be sufficiently rapid to support the switching times for proper multi-head operation.

SUMMARY OF THE METHOD AND SYSTEM

In accordance with the invention, a magnetic storage system having one or more rotating storage disks is disclosed wherein, a method and system for dual element transducer flight height adjustment using combined thermal and electrostatic control avoids or substantially eliminates the above-mentioned problems associated with prior methods of slider flight height adjustment and control.

The present method and system control the flight height of a transducer element of a slider mechanism operating in association with a storage disk. The invention adjusts the flight height of transducer element to a first flight height using an electromechanical control mechanism. The flight height of transducer element then achieves a second flight height using a thermal control mechanism. The thermal control mechanism is associated with a thermally responsive portion of transducer element. By heating the thermally responsive portion, a portion of transducer element becomes sufficiently proximate to the storage disk for the transducer element to respond to physical forces arising from electrostatic induction between transducer element and the storage disk. Flight height adjustment of transducer element from the second flight height to a third flight height may then occur using an electrostatic control mechanism which generates a physical force through electrostatic induction.

A technical advantage of the present invention includes the elimination of problems arising from the use of the thermal control mechanism's heating coil time constant. By more rapidly and responsively providing electrostatic control when transducer element is closest to the storage disk, the present invention avoids problems in providing precise positioning of slider. By using the combination of thermal expansion and electrostatic attraction control, the present method and system allows the transducer to essentially approach a zero flight height above the storage disk. That is, using a thermal control mechanism such as a heating coil allows approaching approximately a three nanometer flight height. The present inventions controlled combination of a heating coil and electrostatic attraction, allows approaching an essentially zero height above the storage disk writing surface.

Other objects, features and advantages of the invention will be apparent from the following specification taken in conjunction with the following drawings.

BRIEF DESCRIPTION OF THE DRAWINGS

For a more complete understanding of the present method and system for dual element transducer flight height adjustment using combined thermal and electrostatic control, reference is now made to the following description which is to be taken in conjunction with the accompanying drawings and in which like reference numbers indicate like features and further wherein.

DETAILED DESCRIPTION OF THE ILLUSTRATIVE EMBODIMENTS

Figure 1:
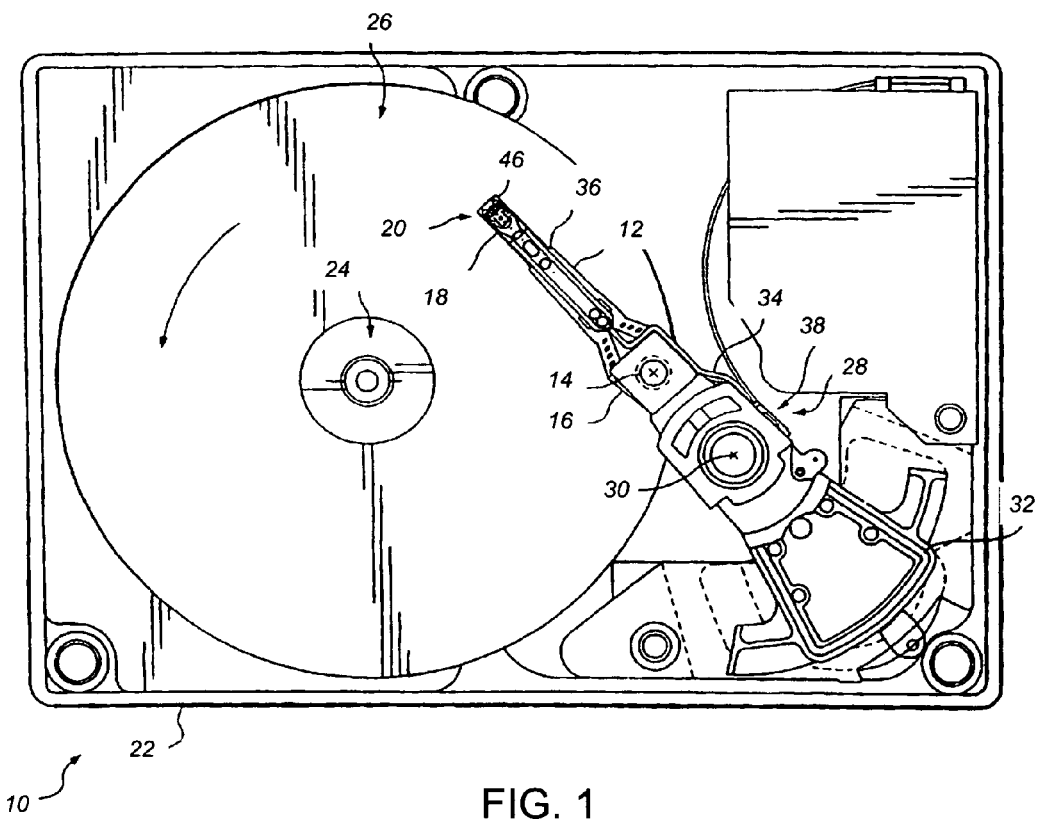
FIG. 1 is a plan view of a hard storage disk drive, showing an actuator with a slider incorporating the present method and system.

While this invention is susceptible of embodiments in many different forms, there is shown in the drawings and will herein be described in detail, a number of preferred embodiments of the invention with the understanding that the present disclosure is to be considered as an exemplification of the principles of the invention and is not intended to limit the broad aspects of the invention to the embodiments illustrated.

In implementing the teachings of the present invention, a number of different approaches to employing both the thermal control mechanism for thermally adjusting the transducer element flight height and the electrostatic control mechanism for electrostatically adjusting the transducer element flight may be used. The novel aspects of combining these two forms of flight height adjustment and control are, therefore, here disclosed, as well as different ways to enable the separate control mechanisms.

To describe one possible implementation of a thermal flight height control mechanism which may be used in the present method and system, FIG. 1 provides a plan view of a hard storage disk drive, showing an actuator with a slider incorporating the present method and system. Referring to FIG. 1, a first embodiment of the present method and system comprises hard storage disk drive 10 including at least one slider 12 having first end 14 dimensioned for mounting on head arm 16 and second end 18 having a gimbaled flexure portion 20 ("flexure portion") attached thereto.

Storage disk drive 10 includes rigid base 22 supporting spindle 24 and a spindle motor (not shown) for rotating at least one storage disk 26 in a direction shown by the curved arrow. Storage disk drive 10 also includes rotary actuator assembly 28 rotationally mounted to base 22 at pivot point 30. Actuator assembly 28 includes voice coil 32 which, when selectively energized by control circuitry (not shown), moves and thereby positions an actuator E-block 34 and head arms 16, with attached slider 12 at radial track positions defined on the facing surfaces of storage disks 26. Slider 12 is secured at its first end 14 to head arm 16 by conventional ball-staking techniques. Trace/film interconnect structure 36 defined on slider 12 couples transducer element to preamplifier/write driver circuit 38.

Figure 2:
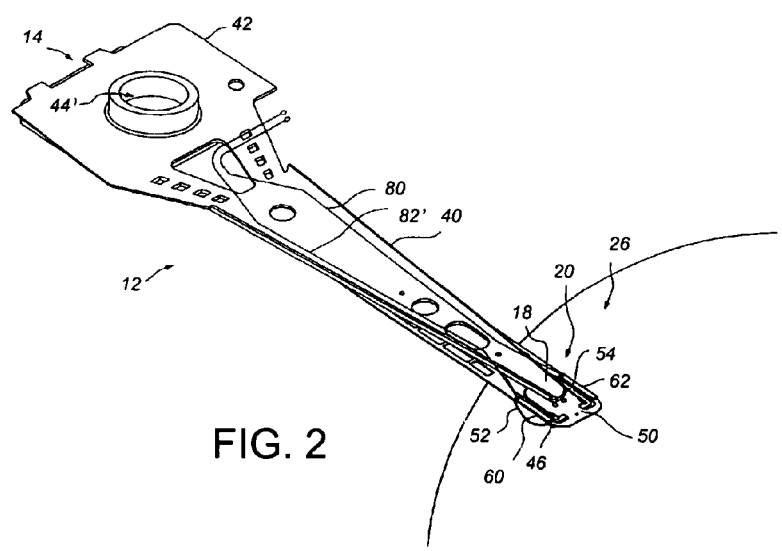
FIG. 2 is a detailed isometric view of slider 12 and storage disk shown in FIG. 1.

FIG. 2 is a detailed isometric view of slider 12 which includes an elongated flexible load beam 40 having first end 14 and second end 18. First end 14 includes base plate 42 with central bore 44. Central bore 44 facilitates coupling load beam 40 to head arm 16 (see FIG. 1). Second end 18 of load beam 40 includes flexure portion 20, which supports transducer element 46 over rotating storage disk 26.

The present method and system control the flight height of a transducer element 46 of a slider mechanism operating in association with storage disk 26. The method includes the step of adjusting the flight height of transducer element 46 to a first flight height. The method further adjusts the flight height of transducer element 46 to a second flight height using a thermal control mechanism. The thermal control mechanism is associated with a thermally responsive portion of transducer element 46. By heating the thermally responsive portion, this step causes a portion of transducer element 46 to be sufficiently proximate the storage disk for transducer element 46 to respond to physical forces arising from electrostatic induction between transducer element 46 and the storage disk. The method then adjusts the flight height of transducer element 46 from the second flight height to a third flight height using an electrostatic control mechanism generating a physical force through electrostatic induction.

In one embodiment of the present method and system, transducer element 46 assumes a first flight height of approximately 10 nanometers from the storage disk. Then, the thermal control mechanism adjusts transducer element 46 to the second flight height of a range of approximately 2 to 4 nanometers from the storage disk. Adjusting transducer element 46 to the third flight height of a range of approximately 0 to 2 nanometers from the storage disk then occurs using the electrostatic control mechanism.

Figure 3:
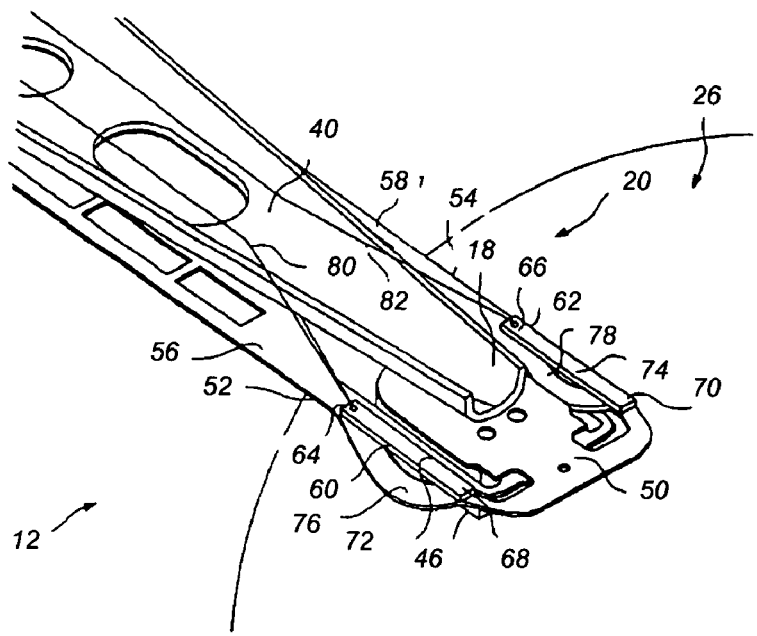
FIG. 3 is a greatly enlarged partial isometric view of slider 12 shown in FIG. 2.

FIG. 3 is a greatly enlarged partial isometric view of slider 12 shown in FIG. 2. FIG. 3 is an enlarged view of the second end of flexure portion 20. Flexure portion 20 comprises flexure tongue 50 and a pair of flexure legs 52 and 54 extending from flexure tongue 50. Ends 56 and 58 of flexure legs 52 and 54 are attached to opposite sides of load beam 40. Typically, ends 56 and 58 of legs 52 and 54 are welded to opposite sides of load beam 40.

Thermal-expansion strips 60 and 62 are attached to flexure legs 52 and 54 respectively. Each strip 60 and 62, respectively, has a first end 64 and 66, a second end 68 and 70, and an intermediate portion 72 and 74. First ends 64 and 66 and second ends 68 and 70 are securely attached to top surfaces 76 and 78 of flexure legs 52 and 54. Intermediate portions 72 and 74 of each strip 60 and 62 float freely over flexure legs 52 and 54. Each thermal-expansion strip 60 and 62 is coupled to a separate power source (not shown) via power conductors 80 and 82 respectively, which are defined along elongated load beam 40 of slider 12. Alternatively, each thermal-expansion strip 60 and 62 is coupled to a single power source (not shown), which single power source can provide electrical current to each of strips 60 and 62 independently. Thermal-expansion strips 60 and 62 can be formed in a number of geometries and can be comprised of a number of metal alloys such as iron-nickel, iron-nickel-cobalt, or iron-nickel-chrome in percentages dependent on the magnitude of the desired coefficient of thermal expansion. In one specific example, thermal-expansion strips 60 and 62 have the following approximate dimensions: 1.5 millimeters in length; 100 to 200 micro-meters in width; and 25–50 micrometers in height. They are comprised of iron-nickel, iron-nickel-cobalt, or iron-nickel-chrome, where the percentage of iron ranges from approximately 20 percent to 60 percent.

Figure 4A:
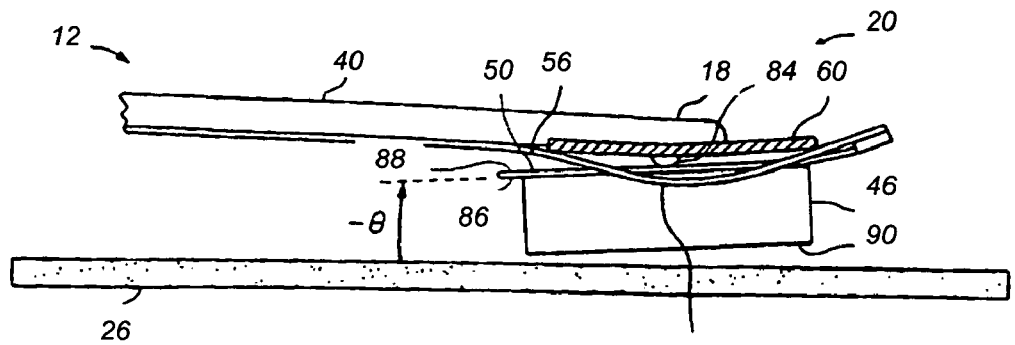
FIG. 4A is a side view of slider 12 shown in FIGS. 2 and 3 supporting a head over a storage disk in a first orientation.
Figure 4B:
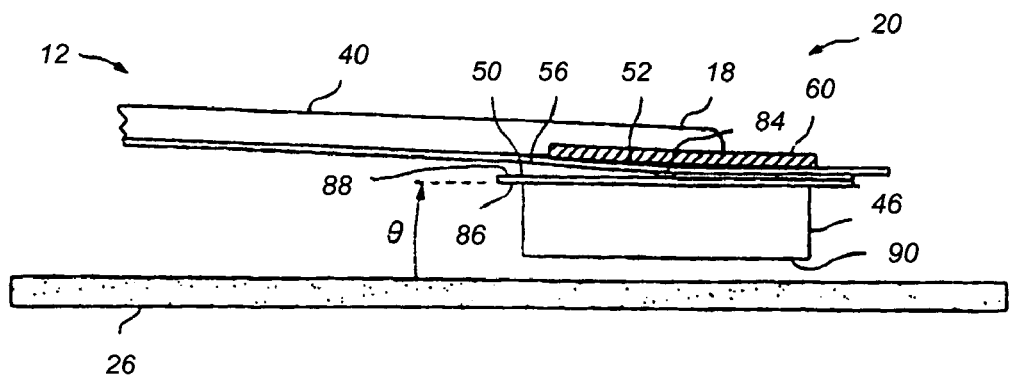
FIG. 4B is another side view of slider 12 shown in FIGS. 2 and 3 supporting a head over the storage disk in a second orientation.
Figure 4C:
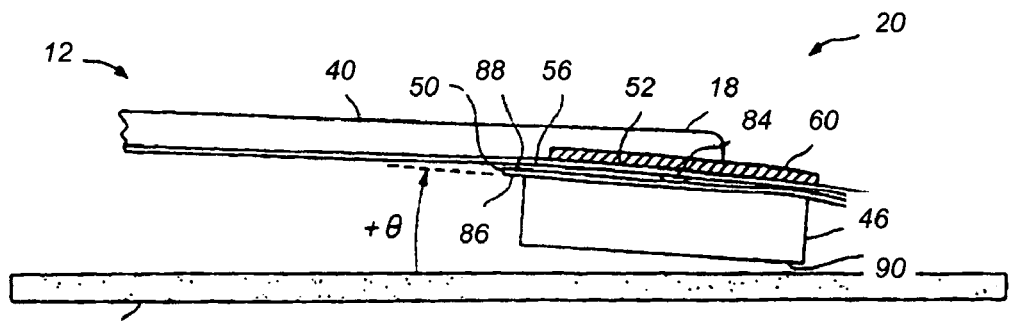
FIG. 4C is another side view of slider 12 shown in FIGS. 2 and 3 supporting a head over the storage disk in a third orientation.

FIGS. 4A through 4C provide side views of slider 12 shown in FIGS. 2 and 3 supporting a head over the storage disk in a third orientation. Referring to FIG. 4A, as curved flexure legs 52 and 54 extend from tongue 50 and attach to load beam 40, the curvature of legs 52 and 54 is transposed to tongue 50 for orienting tongue 50 at a predetermined pitch angle $\theta$ from a tangentially positioned horizontal plane defined by the surface of rotating storage disk 26. Although leg 56 is not visible throughout the views shown in FIG. 4, leg 56 is present in each view shown in FIG. 4 and is oriented parallel with leg 52. Because transducer element 46 is attached to bottom surface 86 of tongue 50, transducer element 46 is also oriented at the predetermined pitch angle $\theta$. A load dimple 84 formed on second end 18 of load beam 40 contacts top surface 88 of tongue 50 so that tongue 50 can pivot about load dimple 84. Pivotal motion of tongue 50 is transposed to transducer element 46 for adjusting the pitch angle $\theta$ of transducer element 46 with respect to rotating storage disk 26.

It is important to note that the orientations of transducer element 46 shown throughout the FIG. 4A views are not to scale and have been exaggerated to illustrate principles of the present method and system. In FIG. 4A, transducer element 46 is supported from flexure portion 20 with static attitude or in a non-operational mode, where flexure portion 20 initially has upwardly curved flexure legs 52 and 54. As flexure tongue 50 is coupled with flexure legs 52 and 54, the initial upward curvature of legs 52 and 54 transposes a negative pitch angle $\theta$ to tongue 50, which is further transposed to transducer element 46 attached thereto. This negative pitch angle $\theta$ of transducer element 46 causes trailing edge 90 of transducer element 46, which carries the read/write transducer (not shown), to be oriented relatively high with respect to storage disk 26.

Referring to FIG. 4B, prior to the commencement of read/write operations, it is necessary to form a positive attitude of flying transducer element 46 with respect to rotating storage disk 26. Accordingly, thermal-expansion strips 60 and 62 (strip 62 not shown) are energized by the power source via power conductors 80 and 82 (see FIG. 3), thermally heating strips 60 and 62 and causing them to partially elongate, a majority of the elongation occurring in intermediate portions 72 and 74 of strips 60 and 62 (see FIG. 3). Although strip 62 is not visible throughout the views shown in FIG. 4, strip 62 is present in each view shown in FIG. 4 and is positioned parallel with strip 60. This elongation of thermal-expansion strips 60 and 62 is transposed to flexure legs 52 and 54 and removes the initial upwardly directed curvature from legs 52 and 54. As a result of removing the initial curvature from flexure legs 52 and 54, the pitch angle $\theta$ of flexure tongue 50 and transducer element 46 attached thereto is positively adjusted, and trailing edge 90 of transducer element 46 flies at a reduced fly height with respect to rotating storage disk 26.

Referring to FIG. 4C, the fly height of trailing edge 90 of transducer element 46 can be further reduced by increasing the electrical current supplied to thermal-expansion strips 60 and 62. Increasing the electrical current supplied to strips 60 and 62, causes strips 60 and 62 to further elongate and downwardly bend flexure legs 52 and 54. Bending flexure legs 52 and 54 downward in such a manner further positively adjusts the pitch angle $\theta$ of transducer element 46. Positively increasing the pitch angle $\theta$ further reduces the flying height of trailing edge 90 of transducer element 46 with respect to rotating storage disk 26.

Although not shown in the FIGUREs, the roll of transducer element 46, which is defined as the side to side rolling or tipping of transducer element 46, can be controlled by selectively energizing and thus selectively thermally elongating strips 60 and 62 to unevenly deform flexure legs 52 and 54. For example, thermally elongating strip 60 more than strip 62 will deform flexure leg 55 more than flexure leg 56 and thereby induce a roll in transducer element 46 in one direction. Conversely, thermally elongating strip 62 more than strip 60 will deform flexure leg 56 more than flexure leg 55 and thereby induce a roll in transducer element 46 in an opposite direction.

The present invention employs a transition from thermal control to electrostatic control based upon the degree of protrusion from thermal expansion occurring during a write operation. Once the thermal protrusion occurs to an extent sufficient to reduce the flight height to a level where electrostatic forces are both controllable and sufficiently strong, the transition electrostatic control of transducer element 46 may take place. The thermal expansion coefficient of strips 60 and 62, therefore, affect the point at which such transition may occur. Once the flight height of transducer element 46 reaches approximately 2 to 3 nanometers, therefore, electrostatic control occurs. A typical time constant of approximately one millisecond, therefore, is needed to reduce the flight height to two nanometers or closer.

Using a combined thermal control mechanism to reach a flight height of approximately three nanometers, followed by electrostatic control, the present method and system provide not only a lower flight, but also a more rapid response to changes in the experienced interplay between transducer element 46 and the surface of storage disk 26. As a write operation occurs, further heating of transducer element 26 and strips 60 and 62 will require flight height adjustments that are more easily and readily made using the electrostatic force to from the electrostatic control mechanism. This is because retraction the thermal control mechanism is slower than the rate of further thermal expansion occurring during the write operation. Because electrostatic control responds more rapidly, transducer element 46 may assume a lower flight height without the significant concerns for its crashing into storage disk 26 when thermal control is only flight height adjustment mechanism.

Figure 5:
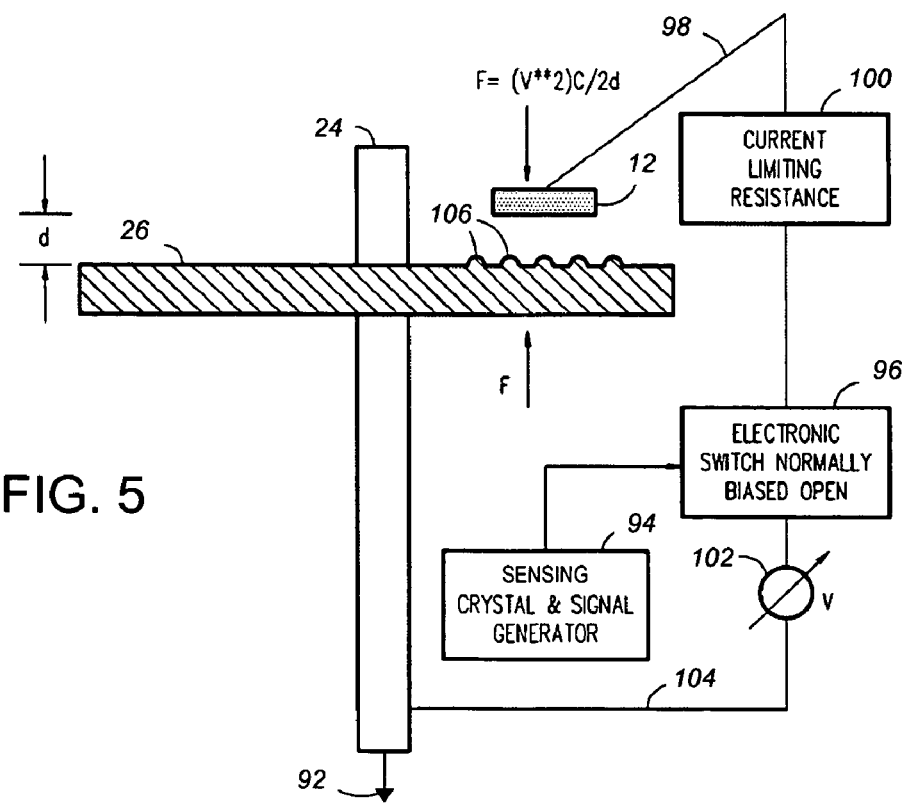
FIG. 5 shows one embodiment of an electrostatic control mechanism according to the teachings of the present method and system.

FIG. 5 shows one embodiment of an electrostatic control mechanism according to the teachings of the present method and system. This is a type of cross-sectional view of a portion of a storage disk drive in which the storage disk 26 is rotated by spindle 24. Slider 12 is shown flying above the storage disk 26 at a height "d". Storage disk 26 is grounded at a designated reference point 92 through the spindle 24. A flight height adjustment-sensing sensor and signal generator 94 is mounted at a predetermined location within the storage disk drive and drives a normally open electronic switch 96. The switch 96, when closed, forms a capacitive series circuit including slider 12, the connecting suspension 98, a current-limiting resistor 100, a voltage source 102, a return path 104, the spindle 24, and storage disk 26. It follows that any flight height adjustment sensed by sensor 94 above a predetermined threshold will cause switch 96 to close (turn on) to close the capacitive path and apply a voltage across slider 12 and the storage disk 26. The voltage should be large enough to generate a force sufficient to hold slider 12 against the air bearing if the storage disk is rotating and against the storage disk if it is not rotating.

When no electric output comes from the sensor 94, and if no other logic has been implemented, then switch 96 is open state, i.e. off, opening the path and removing the voltage. Since the invention involves placing an electrostatic potential between slider 12 and the storage disk 26, it is necessary to insulate slider 12 from the storage disk. When the storage disk is not rotating and slider 12 is parked on the storage disk surface, the insulation consists of the overcoat nominally layered on the storage disk 26. Numerous materials have been suggested and used for overcoats. Any overcoat with a sufficiently high resistance to be electrically insulating (non-conductive) can be used. When the storage disk is rotating, additional insulation and capacitance C is added by the effect of the air bearing. In this regard, the attractive electrostatic or Coulomb force F between slider 12 head and storage disk 26 is related by the following relationship starting from the well-known inverse square law relation:

$$F = V^2 \epsilon \epsilon_0 A / 2d^2 = V^2 C / 2d$$

In this formulation, the permittivity $\epsilon \epsilon_0$, the cross-sectional area A between slider 12 and the storage disk 26, and the shortest path distance d there between form the capacitance attribute C.

In one embodiment, flying height control is achieved by using thermal adjustment plus electrostatic adjustment, according to the following formula:

$$\Delta FH = \Delta FH_{thermal} + \Delta FH_{electrostatic}$$

The moment the heater is turned on and write PTP develops, the $\Delta FH_{electrostatic}$ is reduced to zero. When write is stopped, $\Delta FH_{electrostatic}$ is applied again and the head is exactly at the same FH for the read.

Significantly, electrostatically induced force F controls the positioning of slider 12. This becomes feasible since the flying heights are in the tens of nanometers range. That is, for a low and constant electrostatic potential, F varies inversely with $d^2$. However, for distances of 50 nanometers or less, the attractive force is in the gram force range for applicable voltages. A physical force through electrostatic induction may be accomplished at a voltage significantly lower than a breakdown voltage between transducer element 46 and storage disk 26.

For a typical storage disk drive it has been found that when the voltage V applied between slider 12 and storage disk 26 lies approximately in the range between two and three volts and the preload force on the head is of the order of three to four grams, the use of an additional (electrostatic) force of three to four grams on the head will substantially improve flight height adjustment resistance. Expressed as percentage of the preload force this range is from about 75% to 133% additional force. The amount of preload is one factor determining when slider 12 takes off from the storage disk 26.

Contemporary storage disks 3 may have textured bumps 106 of a height in the range approximating 10–30 nanometers. Thus, a slider 12 landing or parked on such a bump would have a substantial loading if a 2–3 volt potential V were applied. It further has been found that a voltage V equal to 5 volts appears to be a critical limit above which breakdown voltage sparking may occur between slider 12 and the storage disk 26. However, the placement of a current-limiting series resistor 26 avoids any damaging current peaks flowing through the switch and can control any slight breakdown to be within a few microamperes. Also, because the flying height is so small, the electrostatic force can be expressed as $F = kV^2$ where k is a proportionality constant in the range of about 0.5 grams-force/volt.

If the values are substituted in the relation $F = 0.5 \ V^2$, then for a 5-volt DC source the force $= 0.5*(5)^2 \cong 12$ grams-force. The likelihood of sparking is negligible because it is not a function of an electrical avalanche effect. Indeed, the feasibility of the method arises from the low fly heights. Referring again to FIG. 5, it is the case that the flight height adjustment sensor 94 can be formed from a piezoelectric material located in one or more predetermined locations within the storage disk drive. It is well known that piezoelectric crystals develop a voltage between opposite crystal faces when the crystal is subject to mechanical (flight height adjustment) acceleration forces. In this regard, commercial sensor crystals formed from quartz, Rochelle salts, or ceramic crystals such as barium titanate may be used.

The physical placement of the sensor 94 varies as a function of an assessment of the degree of flight height control desired for a given slider. Also, more than one sensor can be used and logically combined so that electrostatic control in more than one direction may be achieved. It should also be appreciated that commercial-grade sensor circuit arrangements include threshold logic (not shown). For purposes of equivalents, it should be understood that a sensor also can be formed from slider 12 and storage disk 26 as plates of a capacitor and flight height adjustments can be controlled using a capacitive displacement current.

Use of a signal from slider 12 or transducer element 46 to indicate flight height adjustment is limited to the time when slider 12 is flying, i.e., the operational mode. Any type of flight height adjustment sensor can be used which is sufficiently sensitive and generates a signal within a sufficiently small time after the flight height adjustment occurs. Furthermore, signals inherently generated in disk drive 10 during a flight height adjustment may be used in place of (or in addition to) a separate sensor if a unique correlation with flight height adjustment is there. For example, if the rotary actuator moves in response to flight height adjustment, electrical signals will be generated at the voice coil motor.

Advantageously, the method and means of this invention are electrically invoked and their response is preferably in the order of several nanoseconds. This is about 200 times faster than the flight height adjustment using the thermal control mechanism of FIGS. 4A through 4C. Especially for high performance drives where read and write operation can be switched during 1 revolution a fast actuation is critical. Significantly, the voltage may only be applied during the flight height adjustment impact time, but can be maintained for some period of time thereafter to avoid rapid cycling. It may also be advantageous to provide logic which ensures that the voltage is applied for a minimum time.

If the control circuitry implementing the present embodiment is powered from a battery, the flight height change control benefits can be obtained even when the external power supply is not connected. The amount of power used by the control circuitry can be made extremely small to avoid burdening the system. Moreover, the equilibrium flying height of slider 12 will change when the electrostatic force is added to the normal loading force, and, therefore, normal operation of the servo system, etc. should not be expected regardless of the direction of the flight height adjustment. The air bearing exerts a repulsive force between slider 12 and the storage disk proportional to $1/d$ in a direction opposite to the attractive electrostatic force. The equilibrium flying height is, therefore, reduced while the attractive electrostatic force is being applied.

Figure 6:
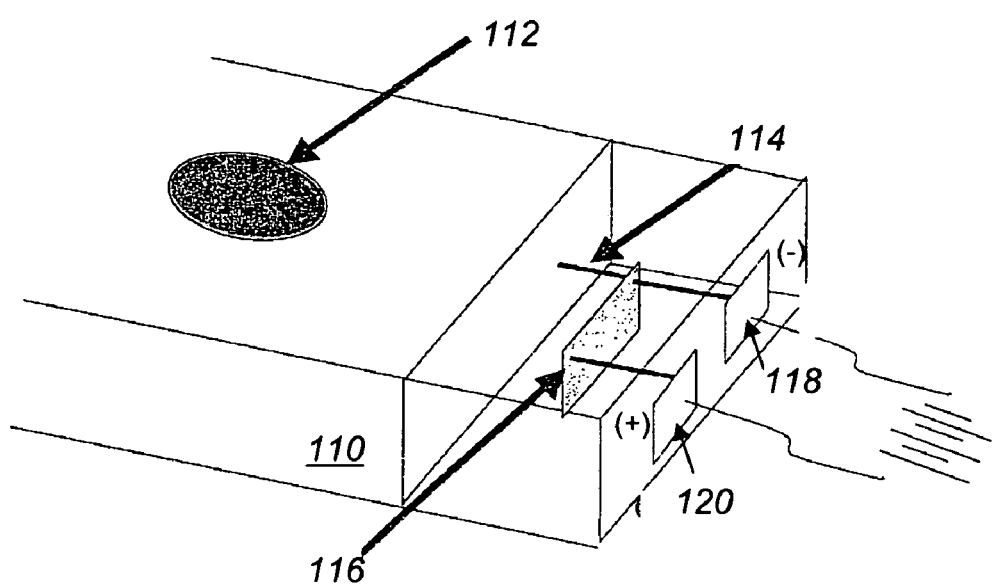
FIG. 6 illustrates conceptually one embodiment of a mechanism for establishing the electrostatic flight height control force according to the present method and system.

FIG. 6 shows one embodiment of slider body 110 of slider 12 on which is formed a dielectric epoxy 112. Stud 114 provides and electrical connection to slider body 110 and passes through flight height adjustment heater 116, which may be configured as heating strips 60 and 62 of FIGS. 4A through 4C. For the purpose of establishing the electrostatic force, N, gold ball bond (GBB) pads 118 and 120 provide, respectively, positive and negative electrostatic voltages. The difference voltage across flight height heater 116 controls power dissipation therein. The electrostatic flight height adjustment can thus be controlled independently of the thermal flight height adjustment using the one differential pre-amp alone.

Connection of stud 114 to slider body 110 is achieved by ion milling through the under layer early in the thin film head process for building an electrical connection to flight height heater 116. Dielectric epoxy 112, which binds slider 12 to its suspension, is non-conductive and may be applied using known processes. Connection to GBB pads 118 and 120 may be achieved by the conventional means, e.g., through traces bound to the head suspension. Voltage control for GBB pads 118 and 120 may be included in the preamp and mounted on the actuator arm. One side of such voltage control, therefore, may dedicated to slider body 110 voltage control.

U.S. Pat. No. 6,567,229, issued to Mallary & Leis., on May 20, 2002 and assigned to Maxtor Corporation ("Mallary") describes and claims several ways of avoiding collisions between a transducer and asperities on the surface of a moving data storage medium. In general, Mallary shows a method and system by which to provide information indicating locations of the asperities on the surface, and relative movement between the transducer and the surface is altered in response to the information. Approaches for altering the relative movement include preventing the transducer from idling over a track that contains an asperity or over a nearby track, and moving the transducer over an asperity-containing track before a read/write operation or away from the track after the read/write operation to avoid colliding with the asperity.

For the purpose of describing another advantage of the present method and system, Mallary is here expressly incorporated by reference. The present method and system, in conjunction with the invention of Mallary, make possible adjusting the flight height of transducer element 46 from the third flight height to a modified third flight height within the time revolution rate of one revolution of the storage disk. Moreover, the present method and system, due to exhibiting a significantly faster response time, permit adjusting the flight height of transducer element 46 from the third flight height to a modified third flight height and back to the third flight height within the time revolution rate of one revolution of the storage disk. Therefore, upon identifying an asperity using the invention of Mallary, the present invention permits adjusting the flight height of transducer element 46 from the third flight height to a modified third flight height using the electrostatic control mechanism at a time less than the duration of one revolution of the storage disk.

The present invention is also an improvement over the sole use of electrostatic attraction. That is, electrostatic attraction forces that would apply to a read/write head are proportional to $1/d^2$. As a result, as slider 12 moves from the write surface, the electrostatic forces quickly go to zero. To increase the voltage in an effort to increase the electrostatic attractive forces, on the other hand, will cause breakdown between the head and storage disk. Thus, in order to appreciate the electrostatic attractive forces, it is necessary to be closer to the writing surface. Consequently, by using the combination of thermal expansion and electrostatic forces, it is possible to have precisely and rapidly adaptive nearly zero flight height between the writing surface and slider.

Another aspect of the very short range forces is that only minor motions are needed for electrostatic compensation. Thus, electrostatic compensation achieves rapid and highly precise transducer flight height adjustment, without delays associated with the thermal compensation approaches. In addition, once the head is at the lower elevations where the electrostatic forces are the greatest, the ability to positively control the head position is enhanced.

Another consideration at flight heights of five (5) nanometers and below Van der Waals forces may pronouncedly affect the head stability. When only a protruding portion of the transducer occupies these flight heights, a smaller head area is exposed to these forces. This permits more precise flight height positioning, because the opposing Van der Waals forces are smaller than would be the case if such protrusions did not exist. As a result, the combination of both the thermal expansion for creating the protrusion and the highly proximate electrostatic attraction yields faster, more responsive, more controllable precise flight height adjustments than either thermal control or electrostatic control alone can achieve.

Although the discussion, thus far, has been limited to magnetic storage disks, the invention should not be so limited. As those skilled in the art will appreciate, this invention can also be applied to magneto-optical storage disks and magnetic drums, among other things. It will be understood, therefore, that the invention may be embodied in other specific forms without departing from the spirit or central characteristics thereof. The present examples and embodiments, therefore, are to be considered in all respects as illustrative and not restrictive, and the invention is not intended to be limited to the details given herein. Preferred embodiments of this method and system are described herein, including the best mode known to the inventor for carrying out the method and system.

What is claimed is:

1. A method for controlling the flight height of a transducer element of a slider mechanism operating in association with a storage media, comprising the steps of:
    adjusting the flight height of transducer element to a first flight height;
    adjusting the flight height of transducer element to a second flight height using a thermal control mechanism associated with a thermally responsive portion of transducer element by heating said thermally responsive portion to form a protrusion of said thermally responsive portion, thereby positioning transducer element sufficiently proximate the storage media for transducer element to respond to physical forces arising from electrostatic induction between transducer element and the storage media; and
    adjusting the flight height of transducer element from said second flight height to a third flight height using an electrostatic control mechanism generating a physical force through electrostatic induction.

2. The method of claim 1, further comprising the step of adjusting transducer element from said third flight height to a modified third flight height in response to further heating of transducer element during a write operation.

3. The method of claim 1, further comprising the step of adjusting transducer element from said second flight height to said third flight height at a response rate of less than one-half of the thermal response rate of adjusting transducer element from the first flight height to the second flight height.

4. The method of claim 1, further comprising the step of adjusting the heating of said thermally responsive portion to form a protrusion of said thermally responsive portion according to the thermal coefficient of expansion of said thermally responsive portion.

5. The method of claim 1, further comprising the step of adjusting transducer element to a first flight height of approximately 10 nanometers from the storage media.

6. The method of claim 1, further comprising the step of adjusting transducer element to said second flight height of a range of approximately 2 to 4 nanometers from the storage media.

7. The method of claim 1, further comprising the step of adjusting transducer element to said third flight height of a range of approximately 0 to 2 nanometers from the storage media.

8. The method of claim 1, further comprising the step of adjusting transducer element to said third flight height using a physical force through electrostatic induction operating at a voltage significantly lower than a breakdown voltage between transducer element and the storage media.

9. The method of claim 1, further comprising the step of adjusting transducer element to said third flight height using a physical force through electrostatic induction operating at a voltage significantly lower than a three-volt breakdown voltage between transducer element and the storage media.

10. The method of claim 1, further comprising the step of dynamically adjusting transducer element to said third flight height in response to local surface variations on the storage media.

11. The method of claim 1, further comprising the step of adjusting the flight height of transducer element from said second flight height to a third flight height within the time revolution rate of one revolution of the storage media.

12. The method of claim 1, further comprising the step of adjusting the flight height of transducer element from said third flight height to a modified third flight height within the time revolution rate of one revolution of the storage media.

13. The method of claim 1, further comprising the step of adjusting the flight height of transducer element from said third flight height to a modified third flight height and back to said third flight height within the time revolution rate of one revolution of the storage media.

14. The method of claim 1, further comprising the step of adjusting the flight height of transducer element from said third flight height to a modified third flight height using said electrostatic control mechanism in response to variations observed on the storage media at a time less than the duration of one revolution of the storage media.

15. The method of claim 14, wherein said adjusting step responds to variations due to an object contaminating a surface of the storage media.

16. The method of claim 14, wherein said adjusting step responds to variations due to an aberration in a surface of the storage media.

17. The method of claim 14, further comprising the step of adjusting transducer element flight height from a storage media comprising a rotating storage disk.

18. The method of claim 14, further comprising the step of adjusting the flight height of transducer element from said third flight height to a modified third flight height using said electrostatic control mechanism in response to variations arising from van der Waals forces affecting transducer element in proximity to the storage media.

19. The method of claim 14, further comprising the step of adjusting the flight height of transducer element from said third flight height to a modified third flight height using said electrostatic control mechanism in response to variations arising from van der Waals forces affecting transducer element in proximity to the storage media during a write operation.

20. The method of claim 14, further comprising the step of adjusting the flight height of transducer element from said third flight height to a modified third flight height using said electrostatic control mechanism in response to variations arising from non-linear forces below 5 nanometers near the writing surface of the storage media.

21. The method of claim 14, further comprising the step of programmably performing said steps of adjusting the flight height using said electro-mechanical control mechanism.

22. The method of claim 14, further comprising the step of programmably performing said steps of adjusting the flight height using said thermal control mechanism.

23. The method of claim 14, further comprising the step of programmably performing said steps of adjusting the flight height using said electrostatic control mechanism.

24. The method of claim 14, wherein said transducer element comprises a first read element and a second read element and further comprising the steps of
controllably switching between said first read element and said second read element; and
adjusting said first read element and second read element using said thermal control mechanism and said electrostatic control mechanism.

25. The method of claim 14, wherein said transducer element comprises a first write element and a second write element and further comprising the steps of
controllably switching between said first write element and said second write element; and
determining prior to said controllably switching step a first flight height adjustment corresponding to said first write element and a second flight height adjustment corresponding to said second write element appropriate; and
adjusting said first write element to said first flight height adjustment and said second write element to said second flight height adjustment using said electrostatic control mechanism.

26. A method for controlling the flight height of a transducer element attached to a slider associated with a storage media, comprising the steps of:
mechanically adjusting slider 12 to position transducer element to a first flight height of approximately 10 nanometers from the storage media surface;
thermally adjusting transducer element to a second flight height of approximately 4 nanometers from the storage media surface using a thermal control mechanism to form a protrusion from a thermally responsive portion of transducer element, said protrusion extending toward the storage media;
electrostatically adjusting transducer element to a third flight height using an electrostatic control mechanism for reducing the flight height of transducer element to approximately 0.2 nanometers or less from the storage media.

27. The method of claim 26, further comprising the step of adjusting transducer element from said third flight height to a modified third flight height in response to further heating of transducer element during a write operation.

28. The method of claim 26, further comprising the step of adjusting transducer element from said second flight height to said third flight height at a response rate of less than one-tenth of the thermal response rate of adjusting transducer element from the first flight height to the second flight height.

29. The method of claim 26, further comprising the step of adjusting the heating of said thermally responsive portion to form a protrusion of said thermally responsive portion according to the thermal coefficient of expansion of said thermally responsive portion.

30. The method of claim 26, further comprising the step of adjusting transducer element to said third flight height using a physical force through electrostatic induction operating at a voltage significantly lower than a breakdown voltage between transducer element and the storage media.

31. The method of claim 26, further comprising the step of adjusting transducer element to said third flight height using a physical force through electrostatic induction operating at a voltage significantly lower than a three-volt breakdown voltage between transducer element and the storage media.

32. The method of claim 26, further comprising the step of dynamically adjusting transducer element to said third flight height in response to local surface variations on the storage media.

33. The method of claim 26, further comprising the step of adjusting the flight height of transducer element from said second flight height to a third flight height within the time revolution rate of one revolution of the storage media.

34. The method of claim 26, further comprising the step of adjusting the flight height of transducer element from said third flight height to a modified third flight height within the time revolution rate of one revolution of the storage media.

35. The method of claim 26, further comprising the step of adjusting the flight height of transducer element from said third flight height to a modified third flight height and back to said third flight height within the time revolution rate of one revolution of the storage media.

36. The method of claim 26, further comprising the step of adjusting the flight height of transducer element from said third flight height to a modified third flight height using said electrostatic control mechanism in response to variations observed on the storage media at a time less than the duration of one revolution of the storage media.

37. The method of claim 26, further comprising the step of adjusting the flight height of transducer element from said third flight height to a modified third flight height using said electrostatic control mechanism in response to variations arising from van der Waals forces affecting transducer element in proximity to the storage media.

38. The method of claim 26, further comprising the step of adjusting the flight height of transducer element from said third flight height to a modified third flight height using said electrostatic control mechanism in response to variations arising from van der Waals forces affecting transducer element in proximity to the storage media during a write operation.

39. The method of claim 26, further comprising the step of adjusting the flight height of transducer element from said third flight height to a modified third flight height using said electrostatic control mechanism in response to variations arising from non-linear forces below 5 nanometers near the writing surface of the storage media.

40. The method of claim 26, wherein said transducer element comprises a first read element and a second read element and further comprising the steps of
controllably switching between said first read element and said second read element; and
adjusting said first read element and second read element using said thermal control mechanism and said electrostatic control mechanism.

41. The method of claim 26, wherein said transducer element comprises a first write element and a second write element and further comprising the steps of controllably switching between said first write element and said second write element; and determining prior to said controllably switching step a first flight height adjustment corresponding to said first write element and a second flight height adjustment corresponding to said second write element appropriate; and adjusting said first write element to said first flight height adjustment and said second write element to said second flight height adjustment using said electrostatic control mechanism.

42. A system for controlling the flight height of a transducer element of a slider mechanism operating in association with a storage media, comprising the steps of:

an electro-mechanical control mechanism for adjusting the flight height of transducer element to a first flight height;

a thermal control mechanism associated with a thermally responsive portion of transducer element for adjusting the flight height of transducer element to a second flight height by heating said thermally responsive portion to form a protrusion of said thermally responsive portion, thereby positioning transducer element sufficiently proximate the storage media for transducer element to respond to physical forces arising from electrostatic induction between transducer element and the storage media; and an electrostatic control mechanism generating a physical force through electrostatic induction for adjusting the flight height of transducer element from said second flight height to a third flight height.

43. The system of claim 42, wherein said electrostatic control mechanism further comprises circuitry for adjusting transducer element from said third flight height to a modified third flight height in response to further heating of transducer element during a write operation.

44. The system of claim 42, wherein said electrostatic control mechanism further comprises circuitry for adjusting transducer element from said second flight height to said third flight height at a response rate of less than one-half of the thermal response rate of adjusting transducer element from the first flight height to the second flight height.

45. The system of claim 42, wherein said electrostatic control mechanism further comprises circuitry for adjusting the heating of said thermally responsive portion to form a protrusion of said thermally responsive portion according to the thermal coefficient of expansion of said thermally responsive portion.

46. The system of claim 42, wherein said electro-mechanical control mechanism further comprises circuitry for adjusting transducer element to a first flight height of approximately 10 nanometers from the storage media.

47. The system of claim 42, wherein said thermal control mechanism further comprises circuitry for adjusting transducer element to said second flight height of a range of approximately 2 to 4 nanometers from the storage media.

48. The system of claim 42, wherein said electrostatic control mechanism further comprises circuitry for adjusting transducer element to said third flight height of a range of approximately 0 to 2 nanometers from the storage media.

49. The system of claim 42, wherein said electrostatic control mechanism further comprises circuitry for adjusting transducer element to said third flight height using a physical force through electrostatic induction operating at a voltage significantly lower than a breakdown voltage between transducer element and the storage media.

50. The system of claim 42, wherein said electrostatic control mechanism further comprises circuitry for adjusting transducer element to said third flight height using a physical force through electrostatic induction operating at a voltage significantly lower than a three-volt breakdown voltage between transducer element and the storage media.

51. The system of claim 42, wherein said electrostatic control mechanism further comprises circuitry for dynamically adjusting transducer element to said third flight height in response to local surface variations on the storage media.

52. The system of claim 42, wherein said electrostatic control mechanism further comprises circuitry for adjusting the flight height of transducer element from said second flight height to a third flight height within the time revolution rate of one revolution of the storage media.

53. The system of claim 42, wherein said electrostatic control mechanism further comprises circuitry for adjusting the flight height of transducer element from said third flight height to a modified third flight height within the time revolution rate of one revolution of the storage media.

54. The system of claim 42, wherein said electrostatic control mechanism further comprises circuitry for adjusting the flight height of transducer element from said third flight height to a modified third flight height and back to said third flight height within the time revolution rate of one revolution of the storage media.

55. The system of claim 42, wherein said electrostatic control mechanism further comprises circuitry for adjusting the flight height of transducer element from said third flight height to a modified third flight height using said electrostatic control mechanism in response to variations observed on the storage media at a time less than the duration of one revolution of the storage media.

56. The system of claim 42, wherein said electrostatic control mechanism further comprises circuitry for adjusting the flight height of transducer element from said third flight height to a modified third flight height using said electrostatic control mechanism in response to variations arising from van der Waals forces affecting transducer element in proximity to the storage media.

57. The system of claim 42, wherein said electrostatic control mechanism further comprises circuitry for adjusting the flight height of transducer element from said third flight height to a modified third flight height using said electrostatic control mechanism in response to variations arising from van der Waals forces affecting transducer element in proximity to the storage media during a write operation.

58. The system of claim 42, wherein said electrostatic control mechanism further comprises circuitry for adjusting the flight height of transducer element from said third flight height to a modified third flight height using said electrostatic control mechanism in response to variations arising from non-linear forces below 5 nanometers near the writing surface of the storage media.

59. The system of claim 42, wherein said transducer element comprises a first read element and a second read element and further comprising:

multi-head control circuitry for controllably switching between said first read element and said second read element; and adjusting circuitry for adjusting said first read element and second read element using said thermal control mechanism and said electrostatic control mechanism.

60. The system of claim 42, wherein said transducer element comprises a first write element and a second write element and further comprising:

multi-head control circuitry for controllably switching between said first write element and said second write element; and determining prior to said controllably switching step a first flight height adjustment corresponding to said first write element and a second flight height adjustment corresponding to said second write element appropriate; and adjusting circuitry associated with said electrostatic control mechanism for adjusting said first write element to said first flight height adjustment and said second write element to said second flight height adjustment.

61. A system for controlling the flight height of a transducer element attached to a slider associated with a storage media, comprising:

an electro-mechanical adjustment mechanism for mechanically adjusting slider to position transducer element to a first flight height of approximately 10 nanometers from the storage media surface;

a thermal control mechanism for thermally adjusting transducer element to a second flight height of approximately 4 nanometers from the storage media surface by forming a protrusion from a thermally responsive portion of transducer element, said protrusion extending toward the storage media;

an electrostatic control mechanism for electrostatically adjusting transducer element to a third flight height for reducing the flight height of transducer element to approximately 0.2 nanometers or less from the storage media.

62. The system of claim 61, wherein said electrostatic control mechanism further comprises circuitry for adjusting transducer element from said third flight height to a modified third flight height in response to further heating of transducer element during a write operation.

63. The system of claim 61, wherein said electrostatic control mechanism further comprises circuitry for adjusting transducer element from said second flight height to said third flight height at a response rate of less than one-tenth of the thermal response rate of adjusting transducer element from the first flight height to the second flight height.

64. The system of claim 61, wherein said electrostatic control mechanism further comprises circuitry for adjusting the heating of said thermally responsive portion to form a protrusion of said thermally responsive portion according to the thermal coefficient of expansion of said thermally responsive portion.

65. The system of claim 61, wherein said electrostatic control mechanism further comprises circuitry for adjusting transducer element to said third flight height using a physical force through electrostatic induction operating at a voltage significantly lower than a breakdown voltage between transducer element and the storage media.

66. The system of claim 61, wherein said electrostatic control mechanism further comprises circuitry for adjusting transducer element to said third flight height using a physical force through electrostatic induction operating at a voltage significantly lower than a three-volt breakdown voltage between transducer element and the storage media.

67. The system of claim 61, wherein said electrostatic control mechanism further comprises circuitry for dynamically adjusting transducer element to said third flight height in response to local surface variations on the storage media.

68. The system of claim 61, wherein said electrostatic control mechanism further comprises circuitry for adjusting the flight height of transducer element from said second flight height to a third flight height within the time revolution rate of one revolution of the storage media.

69. The system of claim 61, wherein said electrostatic control mechanism further comprises circuitry for adjusting the flight height of transducer element from said third flight height to a modified third flight height within the time revolution rate of one revolution of the storage media.

70. The system of claim 61, wherein said electrostatic control mechanism further comprises circuitry for adjusting the flight height of transducer element from said third flight height to a modified third flight height and back to said third flight height within the time revolution rate of one revolution of the storage media.

71. The system of claim 61, wherein said electrostatic control mechanism further comprises circuitry for adjusting the flight height of transducer element from said third flight height to a modified third flight height using said electrostatic control mechanism in response to variations observed on the storage media at a time less than the duration of one revolution of the storage media.

72. The system of claim 61, wherein said electrostatic control mechanism further comprises circuitry for adjusting the flight height of transducer element from said third flight height to a modified third flight height using said electrostatic control mechanism in response to variations arising from van der Waals forces affecting transducer element in proximity to the storage media.

73. The system of claim 61, wherein said electrostatic control mechanism further comprises circuitry for adjusting the flight height of transducer element from said third flight height to a modified third flight height using said electrostatic control mechanism in response to variations arising from van der Waals forces affecting transducer element in proximity to the storage media during a write operation.

74. The system of claim 61, wherein said electrostatic control mechanism further comprises circuitry for adjusting the flight height of transducer element from said third flight height to a modified third flight height using said electrostatic control mechanism in response to variations arising from non-linear forces below 5 nanometers near the writing surface of the storage media.

75. The system of claim 61, wherein said transducer element comprises a first read element and a second read element and further comprising:

sensor switching circuitry for controllably switching between said first read element and said second read element; and multi-head adjustment circuitry associated with said thermal control mechanism and said electrostatic control mechanism for adjusting said first read element and second read element using said thermal control mechanism and said electrostatic control mechanism.

76. A storage disk drive, comprising:

a storage disk for storing information;

a slider mechanism for associating a transducer element with said storage disk for communicating information with the storage disk; and a flight height control system for controlling the flight height of a transducer element of a slider mechanism operating in association with a storage media, comprising:

a electro-mechanical control mechanism for adjusting the flight height of transducer element to a first flight height;

a thermal control mechanism associated with a thermally responsive portion of transducer element for adjusting the flight height of transducer element to a second flight height by heating said thermally responsive portion to form a protrusion of said thermally responsive portion, thereby positioning the transducer element sufficiently proximate to the storage media for transducer element to respond to physical forces arising from electrostatic induction between transducer element and the storage media; and an electrostatic control mechanism generating a physical force through electrostatic induction for adjusting the flight height of transducer element from said second flight height to a third flight height.

* * * * *